Patented Sept. 13, 1949

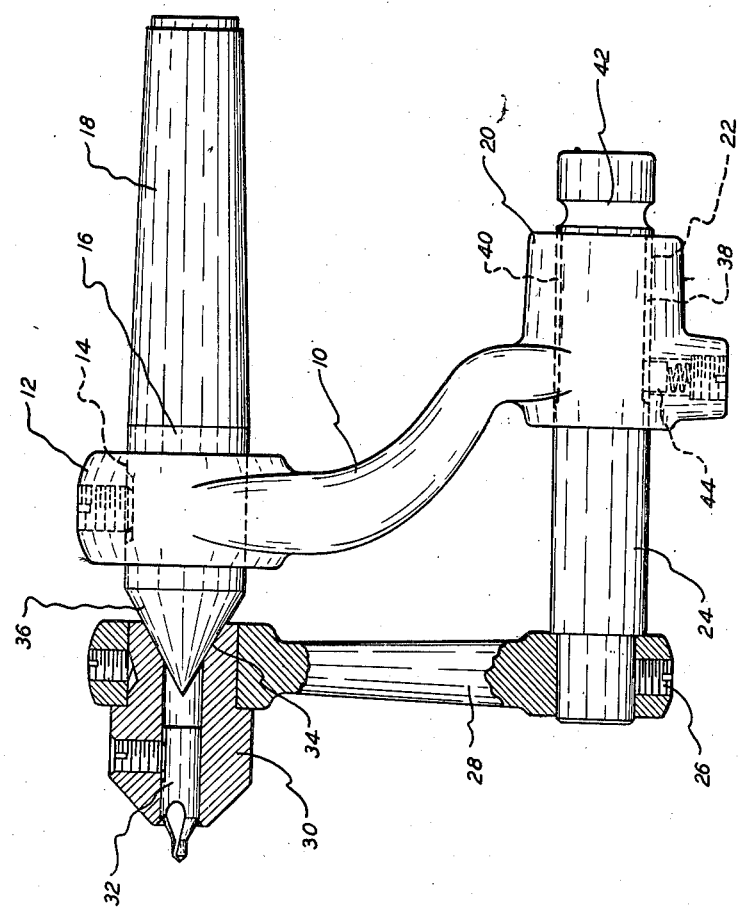

2,481,939

UNITED STATES PATENT OFFICE 2,481,939

COMBINATION CENTER AND CENTER DRILL

Raphael W. Miller, Jackson, Mich.

Application July 13, 1945, Serial No. 604,800

2 Claims. (Cl. 77—18)

The present invention relates to improvements in accessories for lathes and provides a quick change arrangement for center drilling and other similar operations without removing the conventional center from the tailstock.

Where one end of the workpiece in the lathe is held in a suitable chuck and the other end is run upon a center, it is necessary to center drill one end of the workpiece before the center can be applied. If this operation is to be carried out in a lathe without a turret attachment, it is necessary to remove the lathe center and insert a centering drill in the tailstock to perform the centering operation. On production work this operation necessitates a great deal of lost time and it is the purpose of this invention to provide a center drill attachment for the lathe center which will obviate the necessity of removing the center each time the center drilling operation is performed.

Thus one of the principal objects of the present invention is to provide a lathe accessory in the form of a combination lathe center and center drill which may be conveniently employed in the tailstock of any lathe of conventional construction.

Another object of the invention is to provide an accessory for lathe centers which is adapted to be attached to any standard lathe center for the convenient performing of center drilling and kindred operations without removing the lathe center from the tailstock.

Another object of the invention is to provide a lathe accessory in the form of an attachment for the lathe center carrying center drills and the like and permitting the same to be quickly brought into the axis of rotation of the lathe and supported for machining purposes.

These and other objects and advantages residing in the present invention and relating to the combination, construction, and arrangement of parts will be more fully set forth.

In the accompanying drawing is shown in elevation a lathe center with the attachment in position for use.

As illustrated, my improved accessory comprises a bracket member 10 having an enlarged portion 12 provided with a suitable bore 14. The bore 14 is of straight construction in order to receive the cylindrical portion 16 of the lathe center 18. However, it may be tapered in either direction and if desired may have the same taper as that portion of the lathe center which goes into the tailstock. In the preferred form of the invention the center 18 is of special construction to the extent of being provided with a cylindrical portion 16 which cannot exactly be considered standard practice, but at the same time it is not an unusual design for lathe centers especially for centers which are designed to extend a considerable distance beyond the tailstock.

The lower end of the bracket 10 is enlarged as at 20 and provided with a straight bore portion 22 in which is axially slidable and rotatably supported, the shaft 24. Affixed to the outer end of the shaft 24 by set screw 26 is an arm 28 carrying a suitable chuck 30 at its upper end to receive and support in any suitable manner, a center drill 32 or other desired tool.

In order to transfer the rigidity of the center 18 when mounted in the tailstock directly to the chuck 30, the chuck 30 is provided with a conical opening 34 having a taper corresponding to the point 36 of the lathe center 18. It will be understood that the pressure of the work against tool 32 will result in the chuck 30 being firmly positioned in axial alignment upon the point 36.

With shaft 24 axially slidable and rotatable within bore 22, arm 28 can be swung angularly to raise and lower the chuck, and can be moved backwardly and forwardly to seat and unseat the point 36 of the lathe center 18 with respect to the conical opening 34 of the chuck 30, when the chuck is in a raised and aligned relation.

The shaft 24 is axially grooved at 38 and 40 and circumferentially grooved at 42 to provide indexing means for the spring detent 44 which is provided with a rounded nose and is adapted to enter into either of the grooves 38 or 40, with the detent 44 engaging in the groove 42, when the shaft has been axially slid to the left as viewed in the drawings so as to clear the pointed end 36 of the center 18. With the detent 44 in the groove 38, axial movement of the shaft 24 to the right will bring the point 36 of the center 18 into the conical hole 34. When the center 18 of lathe is being used, the arm 28 will be disposed downwardly and the detent 44 will be engaged in the groove 40 to hold the chuck 30 and its associated structure in an out of the way position.

Having thus described my invention what I consider to be new and novel and desire to protect by Letters Patent is:

1. A combination center drill holder for lathe tail-stock centers comprising, with a lathe center, a bracket member having a bore opening through one end receiving the lathe center, means securing the center in the opening with the bracket member extending substantially radially, said bracket member having a second bore opening through the extending end with its axis parallel with the center receiving bore, a shaft axially slidable endwise and rotatably supported in the second bore, an arm secured to and extending radially at the outer end of said shaft, a chuck carried by said arm and spaced from the shaft to center with the tail-stock center and provided with a conical opening to receive and center upon the tail-stock center, and means swingably and slidably retaining the shaft in the bore of the bracket member whereby the arm can be swung angularly to raise and lower the chuck and can be moved backwardly and forwardly to seat and unseat the conical opening of the chuck upon the point of the lathe center when the chuck is in a raised and aligned relation.

2. A combination center drill holder for lathe tail-stock centers comprising, with a lathe center having a substantially cylindrical portion, a bracket member having a bore opening through one end receiving the lathe center, means securing the center in the opening with the bracket member extending substantially radially therefrom, said bracket member having a second bore opening through the extending end with its axis parallel with the center receiving bore, a shaft axially slidable endwise and rotatably supported in the second bore, an arm secured to and extending radially at the outer end of said shaft, a chuck carried by said arm and spaced from the shaft to center with the tail-stock center and provided with a conical opening to receive and center upon the tail-stock center, said shaft being provided with a circumferential groove and having communicating axially extending indexing grooves in the area rotatable and slidable within the second bore of the bracket, and a detent on the bracket member in said grooves engageable in one axial groove to guide movement of the shaft to center the conical opening of the chuck with the tail-stock center and in another groove to dispose the chuck in a position swung away from the center and consequently out of use, said parts being so constructed and assembled that the arm can be swung angularly to raise and lower the chuck and can be moved backwardly and forwardly to seat and unseat the conical opening of the chuck upon the point of the lathe center when the chuck is in a raised and aligned relation.

RAPHAEL W. MILLER.

REFERENCES CITED

The following references are of record in the file of this patent:

UNITED STATES PATENTS

| Number | Name | Date |
|---|---|---|
| 319,071 | Colesworthy | June 2, 1885 |
| 505,013 | Webster | Sept. 12, 1893 |

OTHER REFERENCES

"American Machinist," page 1009, issue of June 9, 1921 (Published by McGraw-Hill Publishing Co., 330 West 42nd St., New York, New York).